Jan. 21, 1969  G. W. FOSTER  3,423,067
VALVE
Filed Sept. 30, 1965  Sheet 1 of 2
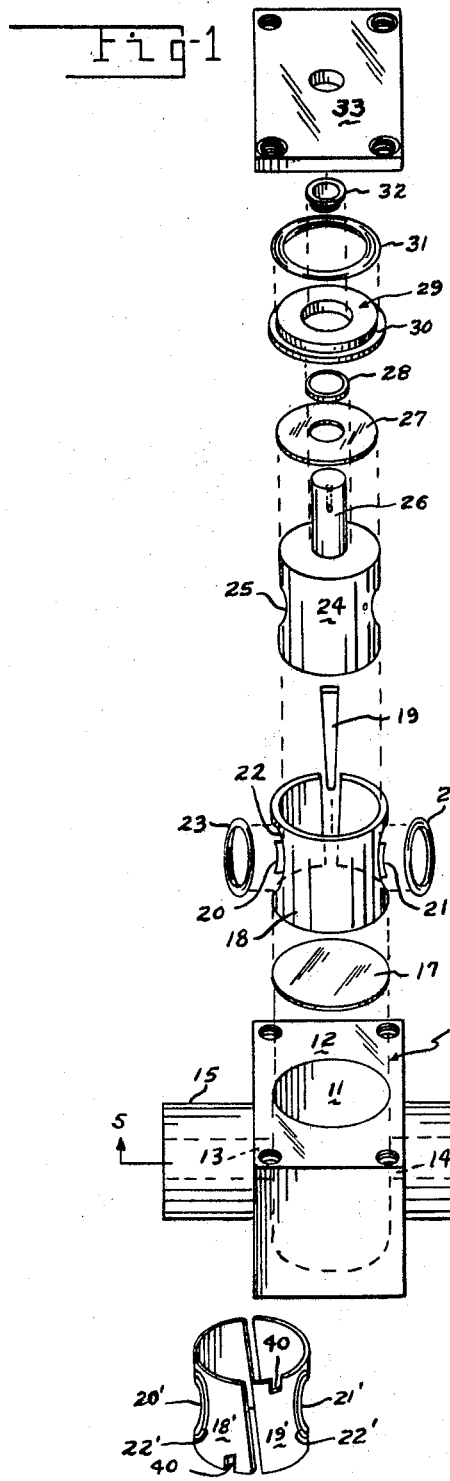
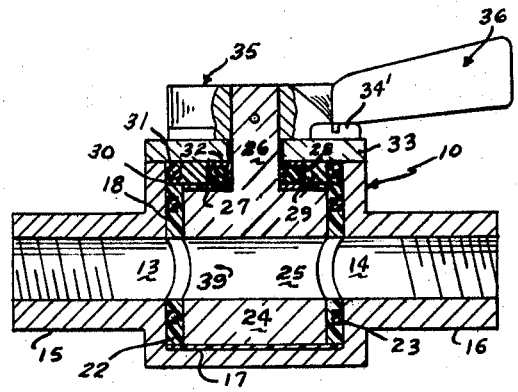
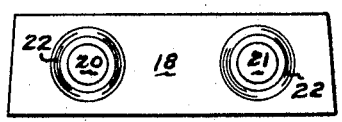
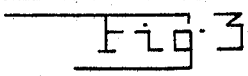
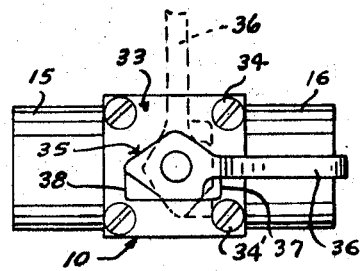
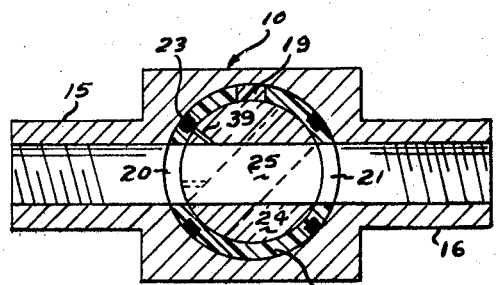
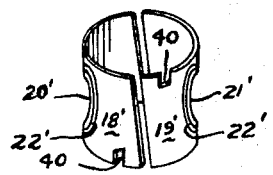
INVENTOR.
GEORGE W. FOSTER
BY
Jerome P. Bloom
ATTORNEYS

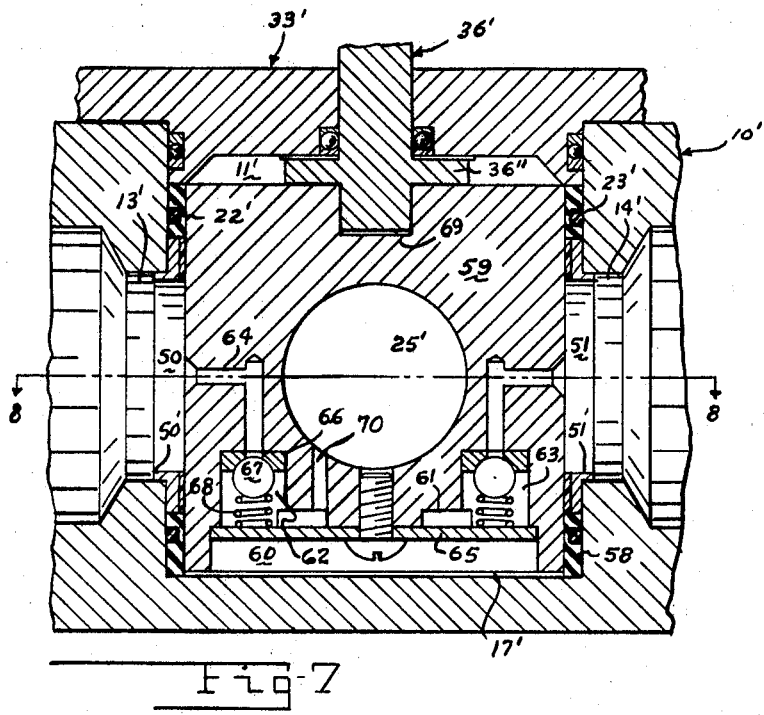
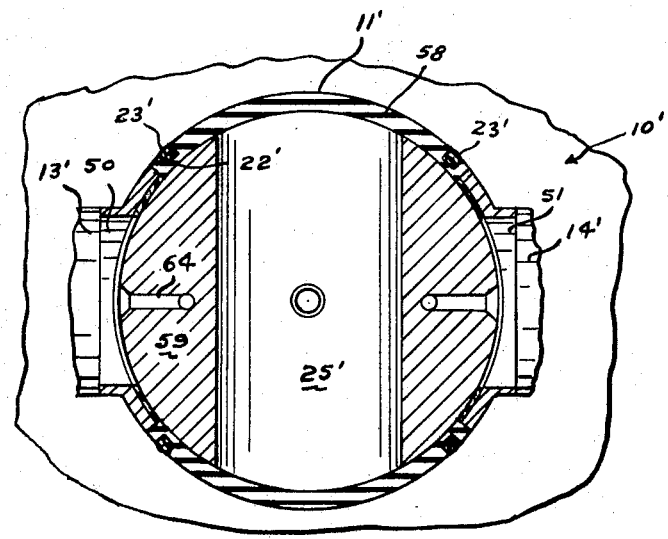

United States Patent Office 3,423,067
Patented Jan. 21, 1969

3,423,067
VALVE
George W. Foster, Inglewood, Calif., assignor to Koehler
 Aircraft Products Company, Dayton, Ohio, a corporation of Ohio
Filed Sept. 30, 1965, Ser. No. 491,653
U.S. Cl. 251—309                    21 Claims
Int. Cl. F16k 5/04, 5/10, 5/18

ABSTRACT OF THE DISCLOSURE

A plug type valve distinguished by a cylindrical plug element rotating in a conforming liner and in a preferred embodiment the lines superposing resilient load elements in rimming relation to flow passages.

---

This invention relates to improvements in line or plug type valves. Embodiments are particularly distinguished by a cylindrical plug rotating in a conforming liner. The inventive features facilitate valve assembly, provide an improved bearing for the valve plug and achieve a novel valve seal. Such features include a simple but effective means for indexing a plug liner and retaining the liner in its index position.

In the prior art the majority of the plug type valves require the plug to be conically tapered and the valve body to have a complementary surface. Such valves require a large jamming force to wedge the plug sufficiently tight to develop unit bearing pressures over the entire plug surface to a degree that a proper seal is effected between the plug and the valve body. The problem with such valves is that their components must have very close tolerances. This is necessary to properly locate the flow holes relative to the taper on the plug and/or the valve body so that a hole in the plug will line up with the holes in the body when the parts are jammed together. Under such circumstances, the respective valve parts inevitably will wear or cold flow. Then in order to maintain a tight seal between the plug and the valve body, the conical surfaces must be wedged even tighter. The additional wedging obviously causes a misalignment of the flow passages and consequent changes in the valve characteristics. A further problem exists in that the large required jamming force produces a high rate of wear and makes a valve hard to turn on and off. In addition, when a tapered plug is used in a valve and subjected to hydraulic forces, there are resultant axial forces which tend to lift and shift the plug in its containing body and a conforming liner would be subject to the same disturbance. By use of the various improvements of the present invention one may not only obviate the above noted problems in the manufacture and use of plug type valves but one may also improve both their structural and functional characteristics.

A primary object of the invention is to provide improvements in plug type valves rendering them more economical to fabricate, more efficient and satisfactory in use, adaptable to a wide variety of applications and unlikely to malfunction.

Another object of the invention is to provide a plug type valve with an improved liner which facilitates its assembly.

A further object of the invention is to provide a plug type valve with an improved plug bearing which reduces its operating torque and increases its life.

An additional object of the invention is to provide a more effective seal for a valve plug.

A further object of the invention is to provide improved readily applied sealing devices for use in plug type valves and similar applications.

Another object of the invention is to provide a plug type valve including a plug liner which can be easily indexed and effectively maintained in its indexed position.

An additional object of the invention is to provide a line or plug type valve possessing the advantageous structural features, the inherent meritorious characteristics and the means and mode of use herein described.

Another object of the invention is to provide a novel liner unit of the character described which is very simple to install and preferably formed from flexible material having a strip form.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings or their equivalents.

Referring to the accompanying drawings wherein are shown some but obviously not necessarily the only forms of embodiment of the invention, FIG. 1 shows an exploded view of most of the pertinent parts of a line valve in accordance with the present invention;

FIG. 2 shows a longitudinal section of the valve of FIG. 1;

FIG. 3 is a plan view of a liner element of molded or strip form such as embodied in the valve unit of FIGS. 1 and 2;

FIG. 4 is a top view of the valve unit as shown in FIG. 2;

FIG. 5 is a horizontal sectional view taken on line 5—5 of FIG. 1 and showing the valve plug in a selectively open or closed position;

FIG. 6 illustrates a modification of the invention which may be incorporated in the device of FIG. 1;

FIG. 7 shows a vertical section of a further embodiment of the invention; and

FIG. 8 is a view taken on line 8—8 of FIG. 7.

Like parts are indicated by similar characters of reference throughout the several views.

In the example illustrated, the improved valve unit includes a valve housing 10 bored to provide it with a cylindrical recess forming a chamber 11 opening from its top 12. The housing 10 includes diametrically opposed apertures which respectively form an inlet passage 13 and an outlet passage 14, intermediately positioned in respect to the vertical extent of chamber 11.

A Teflon bearing washer 17 seats on and coextensively with the base of the chamber 11 while a tape-like flexible insert 18 lines the major portion of the chamber wall. The liner 18 consists of a thin elongated plastic element cut from strip material or molded in a strip form. The lower edge of the liner seats on a peripheral portion of the insert 17 and its upper edge positions inwardly of the top 12 of the housing 10. In the example shown the upper and lower edges of the liner 18 are generally parallel while its respective ends are relatively inclined. The form of the element 18 is such that when applied to the peripheral wall of the chamber 11 its respective end portions so relate to converge and form a wedge shaped space. As is evident in FIG. 1 of the drawings, this space narrows from top to bottom. The lining of the chamber wall is completed by insertion of a wedge-like plastic insert 19 which fills the convergent space. It should be readily obvious from FIG. 1 of the drawings that the insert 19 may be simply and easily applied, the very insertion causing the strip-like liner element to establish itself in a firm adhering relation to the chamber wall.

The liner element 18 includes a pair of apertures 20 and 21. These apertures are so arranged to respectively align with the inlet passage 13 and the output passage 14 in the valve body 10. Each of these apertures is rimmed, on the outermost surface of the element 18 which positions most adjacent to the chamber wall, by a concentric groove 22. At the base of each groove, the thickness of the element 18 is such to produce a membrane-like form. Each groove 22 accommodates a resilient O-ring 23. The cross-sectional diameters of the O-rings 23 are so sized they relatively project from the liner surface. For this reason, as the strip-like element 18 is aplied to the chamber wall, the projected O-rings create an inherent bias of the membrane portions of the strip in a sense radially inward of the chamber 11 and, more specifically, in areas concentric to the openings to the chamber which are rimmed thereby.

Nesting in the liner assembly achieved by the element 18 and the complementary insert 19 is a cylindrically formed valve plug 24. The plug 24 includes a through aperture forming a flow passage 25. As the plug is inserted in the chamber 11, the base thereof grounds on the Teflon bearing insert 17 to accurately align passage 25 with the housing passages 13 and 14 while the periphery thereof is firmly nested to bear on the liner assembly. The latter inludes the thin circular membrane portions above mentioned which are biased to the plug under the influence of the nested O-rings 23, the latter of which project, in relatively opposed relation, to abut the chamber wall.

Thus, when properly inserted in the valve housing 10, the plug 24 is positioned in a bearing frictional contact with the liner assembly and the liner is resiliently loaded by virtue of the compression of the O-rings 23. The loading is provided by a close control of the diameters of the bore of chamber 11 and the plug 24. The O-rings are compressed thereby to form a static seal between the chamber wall and the membrane portions of the liner. The liner membrane portions are flexible to the extent they are biased by the compressed O-rings to form a dynamic seal between the innermost surface of the liner and the plug.

As seen in FIG. 1 of the drawing, plug 24 includes a coaxial stem portion 26 which vertically projects in a sense upwardly and outwardly of the housing 10. Seated to the top of the plug 24 about the stem 26 is an annular bearing washer 27, preferably of Teflon material. The washer 27 nests within the upper extremity of the liner assembly which projects about and slightly upward of the plug.

Mounting about the stem 26 and superposed on the inner peripheral portion of the annular washer 27 is an O-ring 28. The ring 28 is surrounded by an annular plate 29 the base of which includes a peripheral flange 30 at its outer edge. The flange 30 radially projects to overlie the upper extremity of the liner assembly, including the elements 18 and 19, and abut the chamber wall. Nesting to the flange 30, about the outer peripheral portion of the plate 29, is an O-ring 31. A tubular cap 32 complements the O-ring 28 and includes a peripheral flange at its upper end which fits within the inner periphery of the plate 29.

A plate 33 which forms a cover for the top 12 of the body 10 includes a central aperture accommodating the projection therethrough of the stem 26. The cap plate 33 is secured to the housing 10 by four rectangularly arranged screws 34 one of which is identified as 34'. The head of screw 34' projects upwardly from the plate 33 to a greater degree than the heads of the screws 34, the purpose of which shall be further described. In the process of applying the cover plate 33, the valve plug 24 and the surrounding liner assembly is appropriately loaded through the medium of the O-ring 31 and cap 32 in a manner believed obvious.

Pinned to the upper projected extremity of the plug stem 26 is the head 35 of a control handle 36. Viewing FIG. 4 of the drawings, the head 35 includes, to one side of handle 36, projected corners 37 and 38 for abutment with the head of the screw 34' as will be described.

Viewing FIG. 5 of the drawings, it may be seen that the plug body 24 includes a bleed hole 39. The hole 39 is positioned adjacent the inlet end of the flow passage 25, inclined thereto, opening at one end to the passage and at its other end in closely spaced adjacent relation to the entrance to the passage.

It may be readily seen that the valve assembly above described may be economically produced and easily assembled. The nature of the liner assembly which serves as a uniquely efficient bearing for the valve plug element is such to facilitate a ready disposition of apertures 20 and 21 in ready alignment with the inlet passage and outlet passage of the body or housing 10. Not only is the liner assembly of a simple nature but on its application it at once achieves a firm and tight grip of the chamber wall. Further, as previously mentioned, by having the relatively projected O-rings 23 in grooves immediately concentric to the liner strip openings, as the liner elements are applied to the chamber wall, the O-rings position between the wall and the relatively thin membrane portions of the liner material. Thus, when the plug 24 is introduced, there occurs a highly sensitive seal between the liner assembly and the chamber wall and also between the liner and the plug to positively inhibit leakage of fluid thereby. The sensitivity of the relatively thin membrane portions of the liner between the O-rings and the plug provides for a firm frictional positioning of the valve plug to whatever position it may be turned. It will be seen that as the liner per se wears, the O-rings 23, normally under compression, will inherently expand to maintain the described seal between the inner surface of the liner and the cylindrical plug surface and also the static resilient seal between the chamber wall and the membrane portions of the liner.

It should be noted that by virtue of providing a thin membrane portion of the liner at the bottom of each of the O-ring grooves, a high unit pressure is obtained in these particular annular areas to achieve the aforementioned seals. This arrangement enables the described valve unit to have a distinct advantage over conventional plug type valves wherein the unit pressure needed to seal is required to be applied over the entire surface of the plug and the force required to obtain such unit pressure must be very high. This last mentioned characteristic of a conventional valve produces the need for a large torque to turn the valve handle and results in a high rate of component wear.

By means of the wedge-like insert included in the described liner assembly, the possibility is substantially diminished that on turning the plug to produce an open or closed condition of the valve the plug will cause a lift of the liner.

In respect to operating the described valve, as the plug is turned by means of manipulating the control handle 36 to a closed position, shown in dotted lines in FIG. 5 of the drawings, it may be seen that as closing occurs, the bleed hole 39 maintains a continued communication between the plug flow passage 25 and the inlet passage of the housing 10. This provides a balance of the pressure applied on the surface portions of the liner including its membrane portions which lie adjacent the liner openings so that the liner will not be subjected to such pressure differentials as could cause rupture of the membranes and, as a result thereof, damage, for example, to the inlet port seal. Of course, during opening of the valve, the membrane portions are similarly protected against unbalanced pressure.

Viewing FIG. 4 of the drawings, it may be seen that the head 35 of the control handle 36 so relates by means of its corners 37 and 38 to the head of the screw 34' to specifically limit the adjustment of the handle 36 and the plug 24 to a 90° turn. In this way there will be a positive alignment of the passage 25 with the housing inlet and outlet passages 13 and 14 in one extreme position of the handle and a positive closing of this passage in the other.

Thus, the invention unit provides a simplicity of component structure and an assembly thereof in a manner to substantially inhibit any instance of malfunction in use.

A modification of the bearing type liner as may be employed in the above described embodiment of the invention is evidenced in FIG. 6 of the drawings. In this case the liner assembly consists of a pair of identical wedge-form liner elements 18' and 19' one of which inverts relative the other to mate therewith and line the chamber wall. The mating extremities of the strips 18' and 19' are angularly inclined in the same direction so that the insertion of the strip assembly may be made by first applying the section 18' and then the section 19' in an obvious manner. The inherent complementary form thereof causes the strip elements to conform to the chamber wall. In this embodiment the strip 18' includes the opening 20' for alignment with the inlet passage to the housing 10 and the strip 19' includes the opening 21' for alignment with the outlet passage from the housing 10. The elements 18' and 19' are provided with grooves forming membrane portions to accommodate O-rings 23 as and to function in the manner above described in the first instance.

Referring further to FIG. 6, note the notches 40 in each of the illustrated liner segments. With their inclusion the inner wall of chamber 11 is provided with suitable projected means to engage in the notches 40 and thereby index the liner segments to their specifically required positions. In use of this modification of the invention, it will be obvious the liner segments are not required to achieve a positive pressure wedging relation. One need merely dimension the segments for a precision fit to achieve the desired adherence thereof to the chamber wall.

A feature of the invention valve is that it is operative in either of two directions without change in the event of low pressure line flow. In the instance of a high pressure flow, bleed hole 39 should be adjacent to the inlet passage, so that for a 180° change in direction of flow wherein passage 21 would be the inlet, one need only remove the handle 36, turn the plug 180° and replace the handle for proper control of the valve under such conditions.

It may be readily seen that there is no difficulty contemplated in changing the position of the screw 34' as needs require.

Referring now to FIGS. 7 and 8 of the drawings, here is yet a further embodiment of the present invention.

In this last example the valve body 10' is shown in fragmentary form as incorporated in a flow line. It includes an inlet 13', an outlet 14' and forms a chamber 11' capped by a plate 33'. Here the plug liner may be similar in composition and form as in the instances first described save that the openings therein which respectively align with the inlet and the outlet must be relatively enlarged. The enlarged openings are so dimensioned to provide for the one to accommodate a metal ring 50 and the other a similar ring 51. The ring 50, at its inner periphery, incorporates a tubular projection 50' which nests in and lines the inlet 13'. The ring 51 is of identical form and includes a tubular projection 51' which nests in and lines the outlet 14'. The rings 50 and 51 serve an indexing function to facilitate the application and positioning of the plug liner.

While the plug liner may take the form as just described, nevertheless in the embodiment of FIGS. 7 and 8 of the drawings is illustrated yet a further type of liner. The liner is here designated by the numeral 58 and consists of a single thin strip-like element of flexible material and of either cut or molded form.

In the assembly of the valve the base of chamber 11' receives a bearing washer 17' and the rings 50 and 51 are respectively applied to the inlet 13' and outlet 14'. Following this, the integrally formed plastic liner 58 is readily applied to the chamber wall, the openings in the liner accommodating the respective rings and, in the process, the liner molding to and conforming with the wall surface of the chamber 11'. It is to be noted that the inner surface of each ring is Teflon coated and forms an extension of the inner surface of the liner when assembled.

As in the first described modifications of the invention, here each liner opening is rimmed by a concentric groove 22' in the outer surface of the liner. Each groove is of membrane thickness at its base and nests a portion of a projected O-ring 23'. The liner 58 having a cylindrical contour, as defined by the chamber wall, bearingly seats a cylindrical valve plug 59.

The plug 59 is quite distinctive. Its base is bored to provide it with a shallow recess 60 and counter bored to form an annular groove 61 opening at its outer periphery to a pair of diametrically spaced cylindrical recesses 62 and 63. As shown in FIG. 7, a small bore flow passage 64 extends upwardly of the plug from the center of the base of each of the recesses 62 and 63. Each flow passage 64 includes a right angled turn so as to open from the plug, in the one instance to and coaxial with the inlet 13' and in the other instance to and coaxil with the outlet 14'.

A plate 65 is fixed across the base of recess 60 and forms a seal bridging the annular groove 61 and the recesses 62 and 63. The passage opening 64 at the base of each of the recesses 62 and 63 is rimmed by a cupped seat 66 for a ball check valve 67 biased thereto by one of a loaded coil spring 68, the other end of which seats to plate 65.

The upper end of the plug has a rectangular recess 69 receiving the rectangular inner end of a valve control handle 36'. Handle 36' has an external flange 36" which seats to the plug in chamber 11' and nests in a pocket in the bottom of the base of cap 33'. The peripheral portion of the cap which forms this pocket seats on and contains the liner 58 at its upper end. The stem of handle 36' projects through a seal lining a through opening in the cap 33'. The handle detail and the cap detail may otherwise be as previously described in reference to the embodiment of FIG. 1 of the drawings. Suitable seals are of course included in the peripheral portions of the cap which nests in the upper end of the chamber 11'.

The embodiment just described is distinguished by a simple but effective system for protecting the upstream sealing membrane portion of its liner 58 against the incidents of high pressure differentials which might cause it to rupture. For example, as the plug 59 is turned towards a closed position, the pressure in passage 64, 62, 61 and 70 will be reflected in the interior plug flow passage 25'. Incidentally, this will occur irrespective of the direction of flow. Therefore inlet pressure at either port of the housing 10', in such instances, is referenced to the internal cavity defined by the passage 25'. Moreover, the ball check valve remote from the inlet side of the plug prevents downstream leakage. This system prevents high pressure differentials being applied in reference to opposed membrane surfaces and thereby avoids rupture of said membranes and leakage thereby. It will be recognized that a desirable feature is provided by the last described embodiment of the invention in that the indexing rings are such to facilitate the valve assembly, enable the efficient use of a one piece liner, and influence the liner to readily conform and adhere to the chamber wall. Such ring elements, as illustrated, are positive in application and function.

Thus, the invention contemplates an improved valve having safety features and means offering optimum control of its characteristics in use. In respect to any of the embodiments of the present invention, the advantage thereof is particularly enhanced by the cylindrical shapes of the mating component structures.

In summary, the invention achieves a novel plug liner or bearing means and safety features, which, in combination, produce substantial improvements in line or plug type valves. It should be obvious the application of the inventive concept is not limited to valves having a single flow passage. The invention could just as well be embodied in a valve the body and plug of which could have multiple passages disposed at various angles.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A plug-type valve unit comprising, a cylindrical plug having at least one through passage and a housing defining a chamber therefor of cylindrical form including an inlet and an outlet with which said through passage may selectively align, characterized by a bearing unit for said plug consisting of thin resiliently flexible strip-like means having a form to encompass said plug in a peripheral sense and inherently adhere to the chamber wall, said strip-like means including openings aligned with the inlet and outlet and there being resilient means incorporated under compression between only portions of said strip-like means and said chamber wall to inherently apply a concentrated load to said portions of said bearing unit directly adjacent said resilient means to maintain a seal between its inner surface and said plug about at least one of said inlet and said outlet and for said resilient means to simultaneously therewith produce an inward thrust on said portions of the bearing unit to effect a concentrated frictional engagement between said portions and said plug to cause said plug to hold to whatever position to which it may be turned.

2. A plug type valve as in claim 1 characterized by said housing including at least one inlet opening and one outlet opening with which said through passage may be optionally aligned and said bearing unit being characterized by relatively wedging elements which have a slip fit relation to produce the relative form inducing the adherence thereof to the housing wall about the plug, said elements providing apertures for alignment with said openings.

3. A plug type valve unit including a valve plug having a through passage and a housing for said plug including an inlet and an outlet with which said through passage may be optionally aligned, characterized by a liner assembly consisting of liner elements having irregularly formed mating ends encompassing said plug in a peripheral sense and including openings which on alignment of said through passage with said inlet and outlet provide for a continuous movement therethrough of fluid and resilient means interposed between said liner assembly and the adjacent wall of the housing about said plug in a sense circumferentially of at least one of said housing inlet and outlet, said resilient means functioning to produce a seal between the liner and the housing wall and a frictional engagement between said liner assembly and said plug which forms a seal inhibiting passage of fluid thereby.

4. A valve unit as in claim 3 characterized by said liner elements including means for index thereof in reference to said housing.

5. A plug type valve unit including a housing having a cylindrical recess forming a plug chamber and including means defining an inlet thereto and an outlet therefrom, a cylindrical plug within said chamber, said plug having a through passage for alignment with said inlet and outlet, a liner for said plug consisting of thin resiliently flexible strip elements having complementary wedge shaped ends, the physical form being such that mating produces an adherence thereof to the chamber wall about said plug, said liner having openings which respectively align with said inlet and outlet and means in connection therewith providing a pressure seal about portions of said plug which align with said inlet and outlet.

6. A valve unit as described in claim 5, characterized by said liner consisting of a pair of identical relatively inverted strip elements.

7. A valve unit as set forth in claim 5 characterized by the liner consisting of a flexible strip element which substantially encompasses the plug, the respective extremities of which are relatively inclined, and a thin flexible wedge element which completes the liner and influences adherence thereof to the chamber wall.

8. A plug type valve unit including a housing having a cylindrical recess forming a plug chamber and including means defining an inlet thereto and an outlet therefrom, a cylindrical plug within said chamber, said plug having a through passage for alignment with said inlet and outlet, a liner for said plug consisting of strip elements having complementary wedge shaped ends, the mating of which produces an adherence thereof to the chamber wall about said plug, said liner having openings which respectively align with said inlet and outlet and means in connection therewith providing a seal about portions of said plug which align with said inlet and outlet and said liner, to the side thereof adjacent the chamber wall, being grooved about each of the openings which respectively align with the inlet and outlet in said housing and said sealing means consisting of resilient O-rings nesting in and projecting from said grooves to the chamber wall.

9. A valve unit as set forth in claim 8 wherein said grooves are of such a depth to leave a membrane-like layer of strip material between each of the O-rings and the valve plug.

10. A plug type valve unit or the like including a housing having a recess forming a plug chamber, means defining an inlet to said chamber and an outlet therefrom, a plug within said chamber, said plug having a through passage for selective alignment with said inlet and outlet, a liner for said plug consisting of relatively wedged flexible elements, the wedging producing an adherence thereof to said chamber wall, said liner having openings in respective alignment with said inlet and outlet and means provided in said plug affording a bleed hole opening at one end to the outer surface of the plug adjacent the opening providing the inlet to said through passage and at the other end to said through passage, said bleed hole providing for a balanced pressure on said liner during displacement of said through passage from alignment with said chamber inlet and outlet.

11. A valve unit as in claim 10 characterized by said strip-like means including means for an index thereof in reference to said housing.

12. A plug-type valve unit including a valve plug having a through passage and a housing for said plug including an inlet and an outlet with which said through passage may be optionally aligned, characterized by a liner assembly consisting of strip-like means encompassing said plug in a peripheral sense and including openings which on alignment of said through passage with said inlet and outlet provide for a continuous movement therethrough of fluid, resilient means interposed between said liner assembly and the adjacent housing wall in a sense adjacent and circumferentially of at least one of said housing inlet and outlet, said liner assembly being of membrane form in the area thereof which said resilient means abuts, and said resilient means being thereby rendered operative to produce a positive seal between the liner and the housing wall and a frictional engagement between said liner assembly and said plug which forms a seal inhibiting passage of fluid thereby.

13. A plug-type valve unit as in claim 12 characterized by ring-like means for indexing said liner assembly in reference to said housing.

14. A plug type valve unit including a housing having a cylindrical recess forming a plug chamber including means defining an inlet thereto and an outlet therefrom, a cylindrical plug within said chamber, said plug having a through passage for alignment with said inlet and outlet, liner means for said plug having means in operative connection therewith for index thereof and to produce an adherence of said liner means to said chamber wall about said plug, said liner means having openings which in the index thereof respectively align with said inlet and outlet, said liner means being reduced to a membrane-like thickness about each of its openings which align with said inlet and said outlet in said housing, forming grooves thereby, resilient O-rings nesting in and projecting from each of said grooves to the chamber wall and loading the membrane portions of said liner means to seal against said cylindrical plug.

15. A plug type valve unit including a housing having a cylindrical recess forming a plug chamber and including means defining an inlet thereto and an outlet therefrom, a cylindrical plug within said chamber, said plug having a through passage for alignment with said inlet and outlet, a liner for said plug consisting of strip elements having complementary wedge-shaped ends, the mating of which produces an adherence thereof to the chamber wall about said plug, said liner having openings which respectively align with said inlet and outlet and means in connection therewith providing a pressure seal about portions of said plug which align with said inlet and outlet, said liner having portions of thin membrane form and said membrane portions having in underlying relation thereto resilient means for loading said liner to produce said pressure seal.

16. A plug valve, including a housing providing a valve chamber and ports opening into said chamber, liner means made of a plastic or like wear resistant material separably installed in said chamber and having openings to align with the ports in said housing, said liner means comprising flexible liner means made in strip form coiled to have its opposite ends in opposing adjacent relation, said ends being cut obliquely to form when the element is coiled a generally V-shaped slot intermediate its ends, said slot being continuous from top to bottom of said element, a wedge insert between said ends to expand the liner means into close fitting engagement with the wall of said chamber, and a valve plug received in said liner means in a bearing relation thereto and relatively adjustable in a rotary sense to selected control positions.

17. A plug-type valve unit comprising a cylindrical plug having at least one through passage, a housing defining a complementary cylindrical chamber for said plug having at least one inlet and one outlet with which said through passage may selectively align, and a bearing for said plug consisting of thin resiliently flexible complementary slip fit inserts which encompass the entire periphery of said plug, said inserts formed with edge means to matingly wedge with each other to produce a thin liner which per se wedgingly adheres to the chamber wall about said plug, said thin liner providing apertures in line with each said inlet and said outlet.

18. A plug-type valve unit as in claim 17 characterized by means insertable in each said aperture to index said bearing in reference to said housing.

19. A plug-type valve unit including a housing forming a plug chamber having at least one inlet thereto and an outlet therefrom, a plug rotatably confined in said chamber, said plug having a direct through passage adapted on selective positioning thereof to form a direct flow path between said inlet and said outlet, thin resilient strip-like means encompassing said plug and providing apertures for alignment with said inlet and said outlet whereby to provide for a direct flow path from said inlet to said outlet on alignment therewith of said through passage, means defining a devious passage through said plug the extremities of which open from said plug at points displaced from the respective ends of said plug through passage, said devious passage having a branch passage for communication thereof with said plug through passage, said passages including means for establishing a balance of pressure on said strip like means and preventing rupture thereof as the plug is turned to and from an open position aligning its through passage with said inlet and outlet.

20. A plug-type valve including a body forming a cylindrical plug chamber having an inlet thereto and an outlet therefrom, a plug rotatably confined in said chamber having a direct through passage adapted on predetermined rotation thereof to communicate said inlet and said outlet, thin flexible bearing insert means peripherally encompassing said plug in said chamber and defining openings therein to provide for said communication of said inlet and said outlet by way of said direct through passage, means defining a devious flow passage interiorly of said plug opening at generally opposite portions thereof displaced from said through passage, said devious passage having in connection therewith means defining a branch passage of small bore, said branch passage communicating said devious passage with said plug through passage and valve means included to control the direction of flow through said passages whereby to provide for a balanced pressure on said bearing insert means as said plug is being turned to and from a position where said plug through passage communicates said chamber inlet and outlet, irrespective of the direction of applied flow.

21. A plug-type valve unit including a housing forming a cylindrical plug chamber including means defining an inlet thereto and an outlet therefrom, a cylindrical plug within said chamber having a through passage for alignment with said inlet and outlet, liner means for said plug having a form to per se adhere to the chamber wall on application and having openings which respectively align with said inlet and said outlet, said liner being grooved to produce an area thereof of membrane thickness about each of its openings, and O-rings nesting in said grooves, said O-rings being placed under compression between said liner and said chamber wall and applying a frictional holding pressure to said plug, said plug having means defining therein an annular passage and a small bore passage leading from said annular passage to said through passage, said plug having means defining therein a further small bore passage one end of which communicates with said annular passage and the opposite end of which opens from the exterior surface of said plug, displaced in a circumferential sense from said through passage, said annular passage and small bore passages providing means for establishing a balance of pressure on said liner and preventing rupture thereof as the plug is turned to and from an open position aligning the through passage with said inlet and outlet.

References Cited

UNITED STATES PATENTS

| | | | |
|---|---|---|---|
| 861,811 | 7/1907 | Condon | 251—309 X |
| 1,494,395 | 5/1924 | Wells | 251—309 X |
| 1,872,417 | 8/1932 | Dalldorf et al. | 251—309 X |
| 3,066,909 | 12/1962 | Reed | 251—309 |
| 374,833 | 12/1887 | Hill | 308—237 |
| 1,534,501 | 4/1925 | Brown | 308—237 |
| 2,280,141 | 4/1942 | Andrews et al. | 308—237 |
| 2,675,283 | 4/1954 | Thomson. | |
| 2,713,987 | 7/1955 | Schenck | 251—317 |
| 2,911,187 | 11/1959 | Owsley | 251—316 |
| 2,913,219 | 11/1959 | Freed | 251—317 |
| 2,964,341 | 12/1960 | Doyle et al. | |
| 3,061,268 | 10/1962 | Zawacki | 251—314 |
| 3,108,779 | 10/1963 | Anderson | 251—315 |
| 3,157,195 | 11/1964 | McIntosh et al. | 251—317 |

FOREIGN PATENTS

| | | |
|---|---|---|
| 587,700 | 11/1959 | Canada. |
| 724,177 | 1/1932 | France. |

OTHER REFERENCES

Tufline Plug Valves: Bulletin SC–59, Continental Manufacturing Co.; Cincinnati 42, Ohio.

M. CARY NELSON, *Primary Examiner.*

ROBERT C. MILLER, *Assistant Examiner.*

U.S. Cl. X.R.

251—316